United States Patent
Zhao et al.

(10) Patent No.: US 12,192,314 B2
(45) Date of Patent: Jan. 7, 2025

(54) CLOCK QUARTZ OSCILLATOR SYNCHRONIZATION METHOD, APPARATUS AND SYSTEM

(71) Applicants: KINGFAR INTERNATIONAL INC., Beijing (CN); NANJING KINGFAR HEALTH TECHNOLOGY INC., Jiangsu (CN)

(72) Inventors: Qichao Zhao, Beijing (CN); Ran Yang, Beijing (CN)

(73) Assignees: KINGFAR INTERNATIONAL INC., Beijing (CN); NANJING KINGFAR HEALTH TECHNOLOGY INC., Jiangsu (CN)

( * ) Notice: Subject to any disclaimer, the term of this patent is extended or adjusted under 35 U.S.C. 154(b) by 14 days.

(21) Appl. No.: 18/086,928

(22) Filed: Dec. 22, 2022

(65) Prior Publication Data

US 2023/0155807 A1 May 18, 2023

Related U.S. Application Data

(63) Continuation of application No. PCT/CN2022/097367, filed on Jun. 7, 2022.

(30) Foreign Application Priority Data

Nov. 13, 2021 (CN) .......................... 202111343650.2

(51) Int. Cl.
*H04L 7/00* (2006.01)
(52) U.S. Cl.
CPC .................................. *H04L 7/0037* (2013.01)
(58) Field of Classification Search
CPC ..................................................... H04L 7/0037

(Continued)

(56) References Cited

U.S. PATENT DOCUMENTS

2016/0352388 A1* 12/2016 Lane .................... H04B 1/3822

FOREIGN PATENT DOCUMENTS

CN 101588628 A 11/2009
CN 102833062 A 12/2012
(Continued)

OTHER PUBLICATIONS

Machine translation of CN-113055117A (Year: 2021).*
Supplementary European Search Report cited in European Patent Application No. 22822258.4, mailed Dec. 11, 2023, 4 pages.

*Primary Examiner* — Kevin M Burd
(74) *Attorney, Agent, or Firm* — Cooper Legal Group, LLC

(57) ABSTRACT

The present application relates to a clock quartz oscillator synchronization method, system and apparatus, in which the method includes, when a calculation unit is in network connection, calculating a first deviation between a calculation unit time and a network clock time; updating a fundamental deviation according to the first deviation; updating the calculation unit time and calculating an actual refresh frequency of the calculation unit according to the fundamental deviation; calculating a second deviation between the calculation unit time and a sensor time; and according to the second deviation, updating the sensor time and calculating an actual interruption frequency of the sensor. The present application provides a synchronization method for calculation, estimation, correction, compensation of time deviation caused by the clock quartz oscillator, which has a benefit of time deviation reduction when one or more sensors are in data exchange with one or more calculation units.

10 Claims, 3 Drawing Sheets

(58) Field of Classification Search
USPC .......................................................... 375/354
See application file for complete search history.

(56) References Cited

FOREIGN PATENT DOCUMENTS

| | | | |
|---|---|---|---|
| CN | 113055117 A | * | 6/2021 |
| CN | 113645683 A | | 11/2021 |
| CN | 114035740 A | | 2/2022 |
| WO | 2021220034 A1 | | 11/2021 |

\* cited by examiner

CLOCK QUARTZ OSCILLATOR SYNCHRONIZATION METHOD, APPARATUS AND SYSTEM

CROSS-REFERENCE TO RELATED APPLICATIONS

The present application is a continuation of PCT application No. PCT/CN2022/097367, filed on Jun. 7, 2022, which claims the priority benefit of China patent application No. 202111343650.2, filed on Nov. 13, 2021. The entireties of PCT application No. PCT/CN2022/097367 and China patent application No. 202111343650.2 are incorporated herein by reference and made a part of this specification.

TECHNICAL FIELD

The present application relates to the field of time synchronization, and in particular to a clock quartz oscillator synchronization method, apparatus and system for calculation, estimation, correction, compensation of time deviation caused by the clock quartz oscillator.

BACKGROUND

Before the calculation unit is used for some works such as data analysis, an external apparatus like a sensor is usually used to collect data to be processed, and transmit it to the calculation unit to save and wait for processing. All hardware of sensors are provided with clock, as well as the calculation unit are provided with its own clock, when a connection is established between the sensor and the calculation unit, it cannot be avoided that the clock of them will be naturally asynchronous so that the time deviation occurs, which results in large delay or advance of data transmission between the sensor and the calculation unit.

A commonly used solution is that the sensor adjusts its clock according to the clock in calculation unit, which synchronizes the clock in the sensor to the clock in the calculation unit to reduce the time deviation between the sensor and the calculation unit.

However, with the gradual development of the use demand and technology of the project, when a plurality of sensors are in data exchange with a plurality of calculation units, or different calculation units are needed to be replaced in a project to calculate, it is hard to ensure that all clocks in each calculation unit can be entirely identical, if the sensor is synchronous with its connected calculation unit, finally the time of measurement data collected by sensors connected with different calculation units occurs corresponding deviation, which causes a difficulty in subsequent processing of measurement data collected by all of the sensors.

SUMMARY

To reduce the time deviation when one or more sensors and one or more calculation units are in data exchange together, the present application provides a clock quartz oscillator synchronization method, system and apparatus for calculation, estimation, correction, compensation of time deviation caused by the clock quartz oscillator.

In a first aspect, a clock quartz oscillator synchronization method provided in the present application adopts the following technical solution:

A lock quartz oscillator synchronization method, comprising:

when a calculation unit is in network connection, calculating a first deviation between a calculation unit time and a network clock time;

updating a fundamental deviation according to the first deviation;

updating the calculation unit time and calculating an actual refresh frequency of the calculation unit according to the fundamental deviation;

calculating a second deviation between the calculation unit time and a sensor time; and according to the second deviation, updating the sensor time and calculating an actual interruption frequency of the sensor.

By adopting the above technical solution, firstly the calculation unit time is synchronized with the network clock time to ensure the accuracy of the calculation unit time, then the sensor time is synchronized with the calculation unit time to ensure that all sensor times are kept in synchronization with the network clock time, which can reduce the time deviation when one or more sensor exchange data via one or more calculation unit, improve the accuracy and applicability of measurement data, and facilitate the integration and processing of measurement data.

Optionally, calculating a first deviation between a calculation unit time and a network clock time comprises:

calculating and recording a network delay at intervals of a first preset time; and calculating the first deviation between the calculation unit time and the network clock time according to the network delay at intervals of a second preset time.

Optionally, calculating and recording a network delay at intervals of a first preset time comprises:

sending a request to the network clock, recording a request sending time $T_1$; and receiving a response from the network clock, recording a response receiving time $T_4$, a request receiving time $T_2$, and a response sending time $T_3$; wherein, the request receiving time $T_2$ is a time when the network clock receives the request, the response sending time $T_3$ is a time when the network clock returns the response;

calculating the network delay $d=(T_2-T_1)+(T_4-T_3)$.

Optionally, calculating the first deviation between the calculation unit time and the network clock time according to the network delay at intervals of a second preset time comprises:

sorting all network delays d in the second preset time in an ascending order to determine a delay data set, and counting a total amount of all network delays d in the second preset time as n;

establishing a fundamental data set by, starting from the $$\frac{n}{8}$$

-th network delay d, continuously acquiring $$\frac{n}{2}$$

values of the network delays in the delay data set;

according to the fundamental data set, calculating values of operation frequencies and drift frequencies corresponding to each network delay d in fundamental data set, and determining an operation frequency difference set and a drift frequency difference set;

determining a first deviation fitting line according to the operation frequency difference set and the drift frequency difference set, calculating a first gradient of the first deviation fitting line, and calculating the first deviation according to the first gradient.

Optionally, calculating a second deviation between the calculation unit time and a sensor time comprising:

obtaining a data sending time every time when the sensor sends the data and a data receiving time at a time when the calculation unit receives the data, and calculating a first difference value between each of the data receiving time and the data sending time;

determining a maximum value of the first difference value within a third preset time at intervals of a third preset time; and at intervals of a fourth preset time, according to each maximum value of the first difference value in the third preset time and the data sending time corresponding to the maximum value of the first difference value, calculating the second deviation between the sensor time and the calculation unit time, wherein the fourth preset time comprises a plurality of the third preset times.

Optionally, at intervals of a fourth preset time, according to each maximum value of the first difference value in the third preset time and the data sending time corresponding to the maximum value of the first difference value, calculating the second deviation between the sensor time and the calculation unit time comprising:

in an interval of the fourth preset time, according to the maximum value of the first difference value in each of the third preset time and the data sending time corresponding to the maximum value of the first difference, correspondingly determining a first difference value set and a data sending time set;

determining a second deviation fitting line according to the first difference value set and the data sending time set, calculating a second gradient of the second deviation fitting line, and calculating the second deviation according to the second gradient.

Optionally, calculating an actual interruption frequency of the sensor comprising:

calculating an initial interruption time interval $t_1$ according to an initial interruption frequency $f_0$;

calculating an actual interruption time interval $t_2$ according to the interruption time interval $t_1$ and the second deviation $x_2$; wherein, the actual interruption time interval $t_2 = t_1 + x_2 \times 10^6$; and calculating the actual interruption frequency $f_1$ according to the actual interruption time interval $t_2$; wherein, the actual interruption frequency $$f_1 = \frac{1}{t_2}.$$

In a second aspect, a clock quartz oscillator synchronization apparatus provided in the present application adopts the following technical solution:

a clock quartz oscillator synchronization apparatus, comprising a processor, a memory and an application program stored in the memory and configured to be executed by the processor, wherein the application program implements the clock quartz oscillator synchronization method according to the first aspect when being run by the processor.

By adopting the above technical solution, the apparatus separately synchronizes with the time of calculation unit and the sensor, after the synchronization, the sensor is able to upload the data to be processed, collected by itself, to the calculation unit, providing the clock quartz oscillator synchronization apparatus separately can also facilitate the management of the apparatus to complete the method in the first aspect.

In a third aspect, a clock quartz oscillator synchronization system provided in the present application adopts the following technical solution:

a clock quartz oscillator synchronization system, comprising a sensor, a calculation unit and a clock quartz oscillator synchronization apparatus according to the second aspect; wherein the sensor measures and sends a data to be processed; the calculation unit receives the data to be processed from the sensor;

when the calculation unit of the clock quartz oscillator synchronization apparatus is in network connection, a first deviation between a calculation unit time and a network clock time is calculated; a fundamental deviation is updated according to the first deviation; the calculation unit time is updated and an actual refresh frequency of the calculation unit is calculated according to the fundamental deviation;

a second deviation between the calculation unit time and a sensor time is calculated; and the sensor time is updated and an actual interruption frequency of the sensor is calculated.

By adopting the above technical solution, the clock quartz oscillator synchronization apparatus in the system separately synchronizes its time with the calculation unit and the sensor. After the synchronization, the sensor is able to upload the data to be processed, collected by itself, to the calculation unit, which makes all sensor and calculation unit be in time synchronization and have no time deviation, so that the reliability of clock synchronization is improved, and the complexity of calculation is reduced.

In summary, the present application includes at least one of the following beneficial technical effects:

1. All calculation units participated in the project are in time synchronization with network clock, then the sensor and the calculation unit are in time synchronization, to ensure all sensor times and the network times are in synchronization, which reduces the deviation between each of the sensor measurement data.

2. After the time synchronization between the calculation unit and the sensor, the actual refresh frequency in the apparatus and the actual interruption frequency in the sensor are adjusted, and the updated actual refresh frequency and the actual interruption frequency will be used in next synchronization to synchronize, so that the stability of the whole system is improved, and the calculation complexity is reduced.

DESCRIPTION OF THE EMBODIMENTS

For a clear understanding of purpose, technical solution and advantage in present application, the present application will be further described in detail in combination with FIGS. 1-5 and embodiment. It should be understood that the specific embodiment described herein is only used to explain present application, and not used to limit present application.

The embodiment in present application provides a clock quartz oscillator synchronization method, including:
when a calculation unit is in network connection, calculating a first deviation between a calculation unit time and a network clock time;
updating a fundamental deviation according to the first deviation;
updating the calculation unit time and calculating an actual refresh frequency of the calculation unit according to the fundamental deviation
calculating a second deviation between the calculation unit time and a sensor time; and
according to the second deviation, updating the sensor time and calculating an actual interruption frequency of the sensor.

Figure 1:
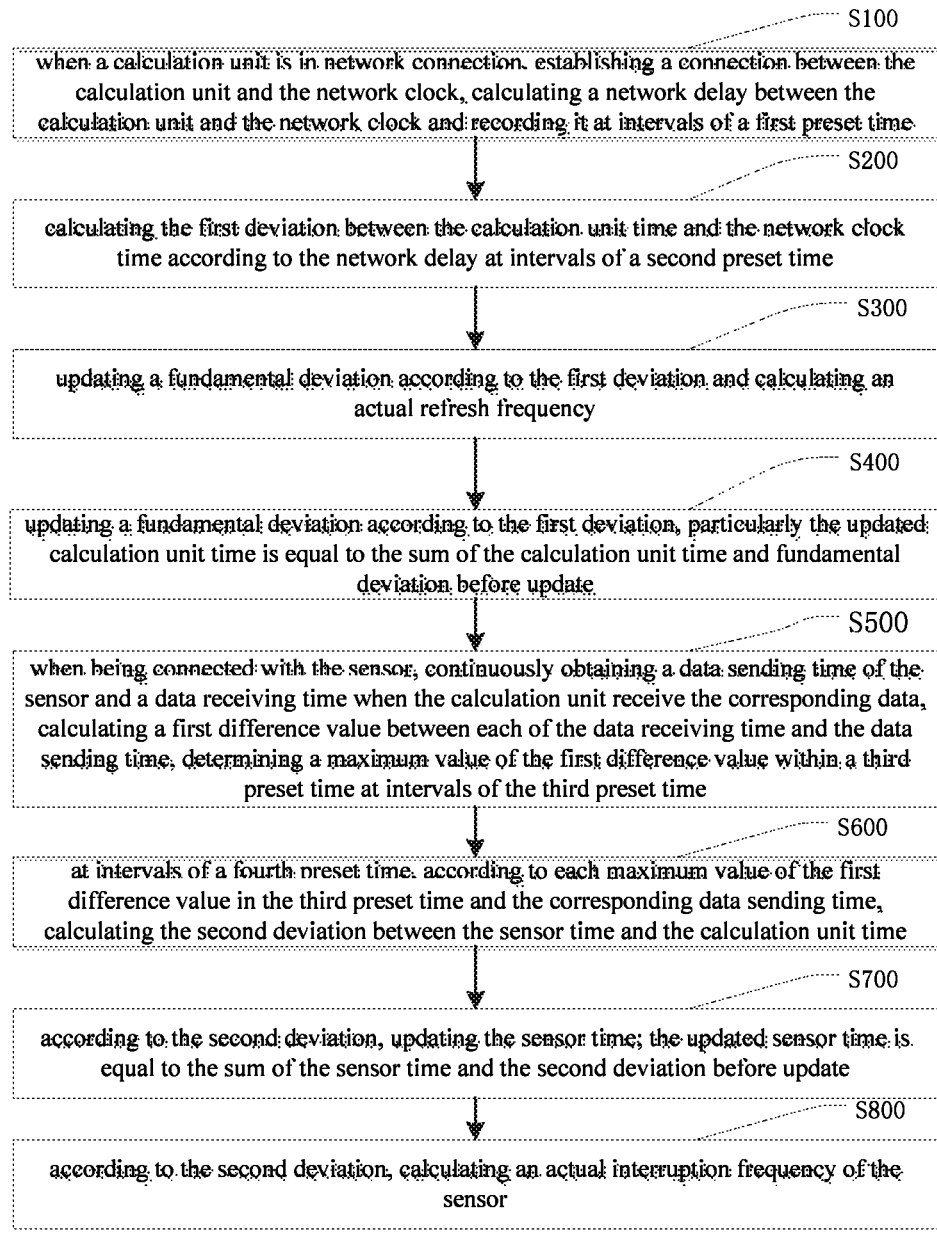
FIG. 1 is a flow chart of the clock quartz oscillator synchronization method according to embodiment of the present application.

Referring to FIG. 1, as one of embodiment of the clock quartz oscillator synchronization method, the method includes:

S100: when a calculation unit is in network connection, establishing a connection between the calculation unit and the network clock, calculating a network delay between the calculation unit and the network clock and recording it at intervals of a first preset time.

Network clock, taking a Network Time Protocol Server as an example, is an agreement configured to synchronize the calculation unit, which makes the calculation unit synchronize its server or clock source and provides a high precision time correction.

S200: calculating the first deviation $x_1$ between the calculation unit time and the network clock time according to the network delay at intervals of a second preset time. In particular, a second preset time includes a plurality of first preset time.

S300: updating a fundamental deviation $x_0$ according to the first deviation $x_1$ and calculating an actual refresh frequency $h_1$.

The initial value of the fundamental deviation is zero, after the calculation of first deviation, if the absolute value of the first deviation is smaller than or equal to a preset threshold value (for example 100), the value of the first deviation is reasonable, the value of the first deviation is used to update the fundamental deviation. If the calculated absolute value of the first deviation is larger than the preset threshold value, the value of the first deviation is unreasonable, which is not used for update of the fundamental deviation. Tick frequency is an index of clock, which represents a refresh frequency of clock within one second in the calculation unit, and an interruption frequency of clock within one second in the sensor.

S400: updating a fundamental deviation according to the first deviation, particularly the updated calculation unit time is equal to the sum of the calculation unit time and fundamental deviation before update.

S500: when being connected with the sensor, continuously obtaining a data sending time of the sensor and a data receiving time when the calculation unit receive the corresponding data, calculating a first difference value between each of the data receiving time and the data sending time, determining a maximum value of the first difference value within a third preset time at intervals of the third preset time.

The data receiving time represents to the time when the sensor sends the data, which is measured by itself and to be processed, to the calculation unit, the data receiving time represents to the time when the calculation unit receives the data to be processed from the sensor.

S600: at intervals of a fourth preset time, according to each maximum value of the first difference value in the third preset time and the corresponding data sending time, calculating the second deviation $x_2$ between the sensor time and the calculation unit time; in particular the fourth preset time includes a plurality of the third preset times.

S700: according to the second deviation $x_2$, updating the sensor time. In particular, the updated sensor time is equal to the sum of the sensor time and the second deviation before update.

S800: according to the second deviation, calculating an actual interruption frequency $f_1$ of the sensor.

The interruption frequency f of the sensor represents to an interruption frequency of signal transmission within one second in the sensor, a fundamental interruption frequency is saved in the sensor.

In present embodiment, S800 includes:
calculating an initial interruption time interval $t_1$ between two consecutive interruption according to the initial interruption frequency $f_0$, particularly, initial interruption time interval $$t_1 = \frac{1}{f_0};$$

calculating an actual interruption time interval $t_2$ according to the interruption time interval $t_1$ and the second deviation $x_2$; wherein, the actual interruption time interval $t_2=t_1+x_2\times10^6$;
calculating the actual interruption frequency $f_1$ according to the actual interruption time interval $t_2$; in particular, the actual interruption frequency $$f_1 = \frac{1}{t_2}.$$

In S100 of embodiment in present application, a network delay calculation method includes:
sending a request to the network clock, recording a request sending time $T_1$;
receiving a response from the network clock, recording a response receiving time $T_4$, a request receiving time $T_2$, and a response sending time $T_3$; in particular, the request receiving time $T_2$ is a time when the network clock receives the request, the response sending time $T_3$ is a time when the network clock returns the response;
calculating the network delay $d=(T_2-T_1)+(T_4-T_3)$.

Figure 2:
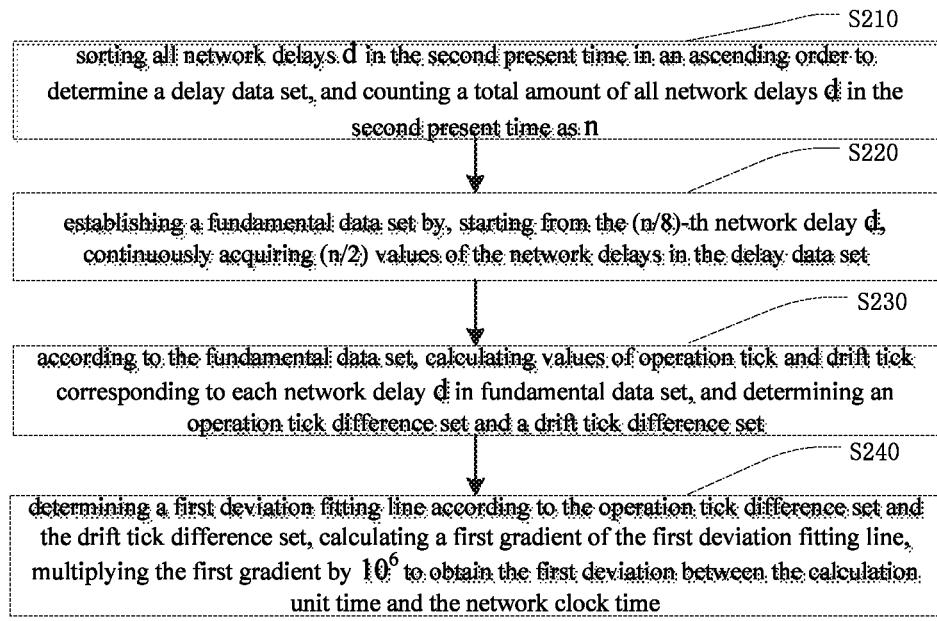
FIG. 2 is a flow chart of the first deviation calculation in the clock quartz oscillator synchronization method according to embodiment of the present application.

Referring to FIG. 2, in S200 of embodiment in present application, a first deviation calculation method includes:

S210, sorting all network delays d in the second preset time in an ascending order to determine a delay data set, and counting a total amount of all network delays d in the second preset time as n.

S220, establishing a fundamental data set by, starting from the $$\frac{n}{8}$$

-th network delay d, continuously acquiring $$\frac{n}{2}$$

values of the network delays in the delay data set.

S230, according to the fundamental data set, calculating values of operation tick and drift tick corresponding to each network delay d in fundamental data set, and determining an operation tick difference set and a drift tick difference set. In particular, tick is a kind of relative time unit, which corresponds to a specific time related to the calculation unit.

S240: determining a first deviation fitting line according to the operation tick difference set and the drift tick difference set, calculating a first gradient of the first deviation fitting line, multiplying the first gradient by $10^6$ to obtain the first deviation $x_1$ between the calculation unit time and the network clock time.

Every data in the operation tick difference set are taken as an abscissa, the data corresponding to the operation tick difference set in the drift tick difference set are taken as an ordinate to be in linear fitting, the first deviation fitting line is determined, the first gradient of the first deviation fitting line reflects the ratio between the drift tick variation and the operation tick variation, which is the first deviation between the calculation unit time and the network clock time.

In embodiment of present application, the S230 includes:
calculating a fundamental time difference t between each calculation unit corresponding to the network delay d and the NTP system, particularly the formula is that:

$$t = \frac{(T_2 - T_1) - (T_3 - T_4)}{2};$$

calculating the operation tick and the drift tick according to the fundamental time difference, to determine a operation tick set and a drift tick set;

In particular, the operation tick is equal to the sum of $T_3$ and the fundamental time difference, particularly:

$$\text{tick}_{running} = T_3 + t = \frac{(T_2 - T_1) + T_3 + T_4}{2}.$$

The drift tick is equal to the difference between $T_4$ and operation tick, particularly, $$\text{tick}_{drift} = T_4 - \text{tick}_{running} = \frac{T_1 - T_2 - T_3 + T_4}{2}.$$

Each data in operation tick set and drift tick set is correspondingly made difference with the first data in operation tick set and the drift tick set, to determine an operation rick difference set and a drift tick difference set.

In S300 of embodiment in present application, a method for calculating an actual refresh frequency includes:
according to an initial refresh frequency $h_0$ of the calculation unit, calculating an initial refresh frequency interval $s_1$; in particular, $$S_1 = \frac{1}{h_0};$$

the initial refresh frequency $h_0$ is a preset value;
according to the initial refresh frequency interval $s_1$ and the fundamental deviation $x_0$, calculating an actual refresh frequency interval $s_2$; in particular, $s_2 = s_1 + x_0$;
according to the actual refresh frequency interval $s_2$, calculating the actual refresh frequency $h_1$; in particular, $$h_1 = \frac{1}{s_2}.$$

Figure 3:
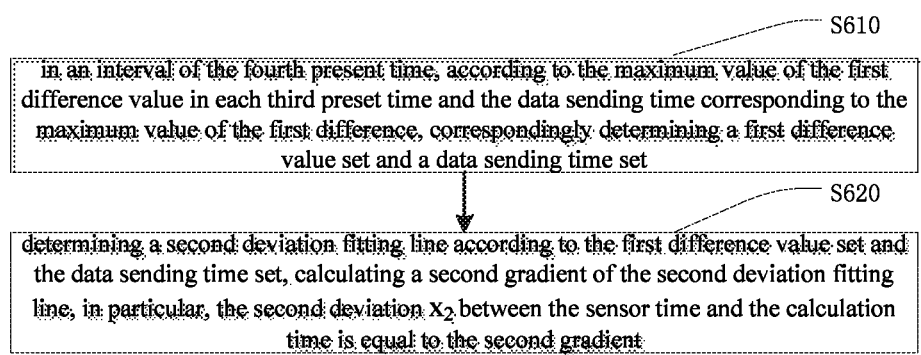
FIG. 3 is a flow chart of the second deviation calculation in the clock quartz oscillator synchronization method according to embodiment of the present application.

Referring to FIG. 3, in embodiment of present application, the S600 includes:

S610: in an interval of the fourth preset time, according to the maximum value of the first difference value in each third preset time and the data sending time corresponding to the maximum value of the first difference, correspondingly determining a first difference value set and a data sending time set.

Each data in the first difference set is equal to the product of corresponding first difference value and $10^6$, each data in the data sending time set is a data sending time when the sensor corresponding to each first difference value sends data to be processed to the calculation unit.

S620: determining a second deviation fitting line according to the first difference value set and the data sending time set, calculating a second gradient of the second deviation fitting line, in particular, the second deviation $x_2$ between the sensor time and the calculation time is equal to the second gradient.

Every data in the data sending time set are taken as an abscissa, the data corresponding to the data sending time set in the first difference set are taken as an ordinate to be in linear fitting, the first deviation fitting line is determined, the second gradient of the second deviation fitting line reflects the ratio between the data sending time and the first difference value, which is the first deviation between the sensor and the calculation unit.

Figure 4:
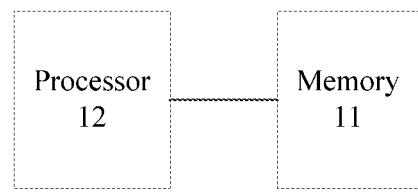
FIG. 4 is a structure diagram of the clock quartz oscillator synchronization apparatus according to embodiment of the present application.

The embodiment in present application further provides a clock quartz oscillator synchronization apparatus, referring to FIG. 4, as one embodiment of the clock quartz oscillator synchronization apparatus, the apparatus includes a memory 11, a processor 12, and an application program stored in the memory 11 and configured to be executed by the processor 12, in which the application program implements the clock quartz oscillator synchronization method illustrated in above description when being run by the processor 12.

Figure 5:
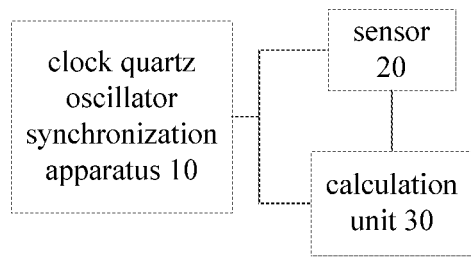
FIG. 5 is a structure diagram of the clock quartz oscillator synchronization system according to embodiment of the present application.

The embodiment in present application provides a clock quartz oscillator synchronization system, referring to FIG. 5, which includes a clock quartz oscillator synchronization apparatus 10 provided in present embodiment, a sensor 20 and calculation unit 30, in which:

the sensor 20, is configured to measure and send a data to be processed;

the calculation unit 30, is configured to receive the data to be processed from the sensor 20;

clock quartz oscillator synchronization apparatus 10, when the calculation unit 30 is in network connection, a first deviation between a calculation unit 30 time and a network clock time is calculated; a fundamental deviation is updated according to the first deviation; the calculation unit 30 time is updated and an actual refresh frequency is calculated according to the fundamental deviation; a second deviation between the calculation unit 30 time and a time of the sensor 20 connected to the calculation unit 30 is calculated; the sensor 20 time is updated and an actual interruption frequency of the sensor 20 is calculated; and the correction between the calculation unit 30 and the sensor 20 is completed.

In embodiment of present application, the clock quartz oscillator synchronization apparatus 10 can be provided on the calculation unit 30, the memory 11 and processor 12 of the clock quartz oscillator synchronization apparatus 10 is the memory and processor of the calculation unit 30.

The above are the preferred embodiments of the present application, and do not limit the protection scope of the present application, any one of the features disclosed in present description (including the abstract and the FIGs), unless specially described, can be replaced with other equivalent or similar alternative features. It means that, unless specially described, each feature is only an example within a series of equivalent or similar features.

What is claimed is:

1. A clock quartz oscillator synchronization method, comprising:

when a calculation unit is in network connection, calculating a first deviation between a calculation unit time and a network clock time;

updating a fundamental deviation based on the first deviation;

updating the calculation unit time and calculating an actual refresh frequency of the calculation unit based on the fundamental deviation;

calculating a second deviation between the calculation unit time and a sensor time; and updating the sensor time and calculating an actual interruption frequency of a sensor based on the second deviation, wherein the calculating an actual interruption frequency of a sensor comprises:

calculating an initial interruption time interval $t_1$ based on an initial interruption frequency $f_0$;

calculating an actual interruption time interval $t_2$ based on the initial interruption time interval $t_1$ and the second deviation $x_2$, wherein the actual interruption time interval $t_2 = t_1 + x_2 \times 10^6$; and calculating the actual interruption frequency $f_1$ based on the actual interruption time interval $t_2$, wherein the actual interruption frequency $$f_1 = \frac{1}{t_2}.$$

2. The clock quartz oscillator synchronization method according to claim 1, wherein the calculating a first deviation between a calculation unit time and a network clock time comprises:

calculating and recording a network delay at intervals of a first preset time; and calculating the first deviation between the calculation unit time and the network clock time based on the network delay at intervals of a second preset time.

3. The clock quartz oscillator synchronization method according to claim 2, wherein the calculating and recording a network delay at intervals of a first preset time comprises:

sending a request to a network clock, and recording a request sending time $T_1$;

receiving a response from the network clock, recording a response receiving time $T_4$, a request receiving time $T_2$, and a response sending time $T_3$, wherein the request receiving time $T_2$ is a time when the network clock receives the request, and the response sending time $T_3$ is a time when the network clock returns the response; and calculating the network delay $d=(T_2-T_1)+(T_4-T_3)$.

4. The clock quartz oscillator synchronization method according to claim 2, wherein the calculating the first deviation between the calculation unit time and the network clock time based on the network delay at intervals of a second preset time comprises:

sorting all network delays d during the second preset time in ascending order to obtain a delay data set, and counting a total amount of the all network delays d during the second preset time as n;

establishing a fundamental data set by, starting from a $$\frac{n}{8}$$

-th network delay d, continuously acquiring $$\frac{n}{2}$$

values of the network delays in the delay data set;

based on the fundamental data set, calculating an operation frequency and a drift frequency corresponding to each network delay d in the fundamental data set, and obtain an operation frequency difference set and a drift frequency difference set; and determining a first deviation fitting line based on the operation frequency difference set and the drift frequency difference set, calculating a first gradient of the first deviation fitting line, and calculating the first deviation based on the first gradient.

5. The clock quartz oscillator synchronization method according to claim 1, wherein the calculating a second deviation between the calculation unit time and a sensor time comprises:

obtaining a data sending time every time the sensor sends data and a data receiving time at which the calculation unit receives the data, and calculating a first difference value between each of the data receiving time and each of the data sending time;

determining a maximum value of the first difference value within a third preset time at intervals of the third preset time; and at intervals of a fourth preset time, based on a maximum value of the first difference value in each of the third preset time and a data sending time corresponding to the maximum value of the first difference value, calculating the second deviation between the sensor time and the calculation unit time, wherein the fourth preset time comprises a plurality of the third preset times.

6. The clock quartz oscillator synchronization method according to claim 5, wherein the at intervals of a fourth preset time, based on a maximum value of the first difference value in each of the third preset time and a data sending time corresponding to the maximum value of the first difference value, calculating the second deviation between the sensor time and the calculation unit time comprises:
in the fourth preset time, based on the maximum value of the first difference value in each of the third preset time and the data sending time corresponding to the maximum value of the first difference value, determining a first difference value set and a data sending time set; and
determining a second deviation fitting line based on the first difference value set and the data sending time set, calculating a second gradient of the second deviation fitting line, and calculating the second deviation based on the second gradient.

7. A clock quartz oscillator synchronization apparatus, comprising: a processor, and a memory with a computer program stored thereon, wherein the computer program is configured to be executed by the processor to implement the clock quartz oscillator synchronization method according to claim 1.

8. A clock quartz oscillator synchronization system, comprising: the sensor, the calculation unit and the clock quartz oscillator synchronization apparatus according to claim 7; wherein,
the sensor is configured to measure and send data to be processed;
the calculation unit is configured to receive the data to be processed from the sensor;
the clock quartz oscillator synchronization apparatus is configured to:
when the calculation unit is in network connection, calculate the first deviation between the calculation unit time and the network clock time;
update the fundamental deviation based on the first deviation;
update the calculation unit time and calculate the actual refresh frequency of the calculation unit based on the fundamental deviation;
calculate the second deviation between the calculation unit time and the sensor time; and
update the sensor time and calculate the actual interruption frequency of the sensor based on the second deviation.

9. A clock quartz oscillator synchronization method, comprising:
when a calculation unit is in network connection, calculating a first deviation between a calculation unit time and a network clock time;
updating a fundamental deviation based on the first deviation;
updating the calculation unit time and calculating an actual refresh frequency of the calculation unit based on the fundamental deviation;
calculating a second deviation between the calculation unit time and a sensor time; and
updating the sensor time and calculating an actual interruption frequency of a sensor based on the second deviation,
wherein the calculating a first deviation between a calculation unit time and a network clock time comprises:
calculating and recording a network delay at intervals of a first preset time; and
calculating the first deviation between the calculation unit time and the network clock time based on the network delay at intervals of a second preset time, and
wherein the calculating the first deviation between the calculation unit time and the network clock time based on the network delay at intervals of a second preset time comprises:
sorting all network delays d during the second preset time in ascending order to obtain a delay data set, and counting a total amount of the all network delays d during the second preset time as n;
establishing a fundamental data set by, starting from an $$\frac{n}{8-th}$$

-th network delay d, continuously acquiring $$\frac{n}{2}$$

values of the network delays in the delay data set;
based on the fundamental data set, calculating an operation frequency and a drift frequency corresponding to each network delay d in the fundamental data set, and obtain an operation frequency difference set and a drift frequency difference set; and
determining a first deviation fitting line based on the operation frequency difference set and the drift frequency difference set, calculating a first gradient of the first deviation fitting line, and calculating the first deviation based on the first gradient.

10. A clock quartz oscillator synchronization method, comprising:
when a calculation unit is in network connection, calculating a first deviation between a calculation unit time and a network clock time;
updating a fundamental deviation based on the first deviation;
updating the calculation unit time and calculating an actual refresh frequency of the calculation unit based on the fundamental deviation;
calculating a second deviation between the calculation unit time and a sensor time; and
updating the sensor time and calculating an actual interruption frequency of a sensor based on the second deviation,
wherein the calculating a second deviation between the calculation unit time and a sensor time comprises:
obtaining a data sending time every time the sensor sends data and a data receiving time at which the calculation unit receives the data, and calculating a first difference value between each of the data receiving time and each of the data sending time;
determining a maximum value of the first difference value within a third preset time at intervals of the third preset time; and
at intervals of a fourth preset time, based on a maximum value of the first difference value in each of the third preset time and a data sending time corresponding to the maximum value of the first difference value, calculating the second deviation between the sensor time and the calculation unit time, wherein the fourth preset time comprises a plurality of the third preset times, and wherein the at intervals of a fourth preset time, based on a maximum value of the first difference value in each of the third preset time and a data sending time corresponding to the maximum value of the first difference value, calculating the second deviation between the sensor time and the calculation unit time comprises:

in the fourth preset time, based on the maximum value of the first difference value in each of the third preset time and the data sending time corresponding to the maximum value of the first difference value, determining a first difference value set and a data sending time set; and determining a second deviation fitting line based on the first difference value set and the data sending time set, calculating a second gradient of the second deviation fitting line, and calculating the second deviation based on the second gradient.

* * * * *